United States Patent [19]

Schnee et al.

[11] 4,290,142
[45] Sep. 15, 1981

[54] INTERACTIVE CABLE TELEVISION SYSTEM

[75] Inventors: Rolf Schnee; Franz Kraus; Friedrich Kiel; Helmut Kliem; Wolfgang Krick, all of Berlin; Herbert Landgraf, Darmstadt, all of Fed. Rep. of Germany

[73] Assignee: Heinrich-Hertz-Institut für Nachrichtentechnik Berlin GmbH, Berlin, Fed. Rep. of Germany

[21] Appl. No.: 14,282

[22] Filed: Feb. 22, 1979

[30] Foreign Application Priority Data

Feb. 22, 1978 [DE] Fed. Rep. of Germany ....... 2807986

[51] Int. Cl.³ .......................................... H04B 3/04
[52] U.S. Cl. ..................................... 455/3; 178/63 C
[58] Field of Search ................... 325/308, 309, 51, 53, 325/54, 57; 178/63 C; 340/310 R, 150, 151; 358/86; 455/2-6

[56] References Cited

U.S. PATENT DOCUMENTS

| 3,581,209 | 5/1971 | Zimmerman | 325/308 |
| 3,840,812 | 10/1974 | Takeuchi | 325/308 |
| 3,886,454 | 5/1975 | Oakley et al. | 325/308 |
| 3,909,560 | 9/1975 | Martinet al. | 455/3 |
| 3,943,447 | 3/1976 | Shomo | 325/308 |
| 4,015,074 | 3/1977 | Inoue et al. | 325/308 |
| 4,064,460 | 12/1977 | Gargini | 455/3 |
| 4,066,966 | 1/1978 | Takeuchi et al. | 455/3 |
| 4,090,220 | 5/1978 | Gargini | 358/86 |

FOREIGN PATENT DOCUMENTS

1506924 4/1978 United Kingdom ................ 455/3

OTHER PUBLICATIONS

Design of a Switched Broad-Band Communications Network for Interactive Services, by Kenneth Rose, IEEE Transaction in Communication, Jan. 1975, pp. 49-55.

Multipurpose Wide-Band Local Distribution-Proposals for an Integrated System, by A. G. Hare, IEEE Transactions on Communications, vol. COM-23, No. 1, Jan. 1975, pp. 42-48.

"Rundfunktechnische Mitteilungen", vol. 20, No. 5 (1976), pp. 173-182, by Wolfgang Horak.

Primary Examiner—Benedict V. Safourek
Assistant Examiner—Tommy P. Chin
Attorney, Agent, or Firm—Spencer & Kaye

[57] ABSTRACT

An interactive cable television system for serving a plurality of user locations in a service area divided into a plurality of service regions, including a central office and a service network having a portion composed of parallel cables arranged in a tree pattern possessing a plurality of nodes remote from the user locations and, in the vicinity of the users, a further portion representing the lowermost plane of the network and composed of transmission cables connected to groups of user locations, the transmission cables being connected to each group in a star pattern, the system presenting a plurality of transmission paths and permitting multiple utilization of the paths, the parallel cables of the first mentioned portion of the network being connected in each service region in a tree structure extending from one node toward the user locations and being constituted by two parallel autonomous sets of cables, thus representing medium planes of the network, the network further including, in each service region, a plurality of junction devices each connected to the parallel autonomous sets of cables at the end in the vicinity of the users and to the transmission cables of a respective group of user locations and in the uppermost plane of the network, a first connecting cable which is common to all nodes and connected between the central office and all nodes in a tree structure, the first cable being connected at the nodes to one of the sets of cables, and second connecting cables connected to the central office in a star structure and independently of one another and of the first connecting cable, each second connecting cable being connected at a respective node to a portion of the other set of parallel cables associated with a respective service region.

6 Claims, 5 Drawing Figures

INTERACTIVE CABLE TELEVISION SYSTEM

BACKGROUND OF THE INVENTION

The present invention relates to an interactive cable television system of the type which effects multiple utilization of the transmission paths in a total service area which is subdivided into service regions and includes a central distributing/collecting/receiving/transmitting/exchanging office, and a supply network formed in part of parallel cables in a tree structure and, in the network regions adjacent one or more users, in a star structure.

In addition to the conventional purpose of distributing radio and television programs, it is desirable to provide the capability for conducting individual broadband information and narrow band data exchange between users and the cable television central office. Depending on whether such a system is to be a new installation or an expansion of existing devices together with a modification of existing distribution system networks and devices, various different design concepts may be employed. Additionally, the number and type of distribution and individual services to be made available as well as the number and extent of data exchange participation of the users are of decisive significance to the design selection.

The publication "Rundfunktechnische Mitteilungen" (Radio Technical Information), Volume 20, No. 5 (1976), at pages 173–182, discloses possibilities and problems associated with technical design for a two-way cable television system. Suitable services to be performed, i.e.: unlimited information distribution available to all users; limited information distribution to selected users; information collecting; and dialog with the central office, require, for economical handling, appropriate network design for the transmission channels in the distribution direction and for the return path back to the central office, as well as a suitable concept for a transmission system in which a distributing and collecting system for television signals, digital transmission systems, transmission procedures, and terminal equipment at the user's end and devices in the central office, as well as still picture transmission systems, are included.

Regarding network design, the above-cited publication discloses, for example, structures which start out with a tree-shaped network, which is most favorable for a purely distributing system. An increase in the transmission capacity required, in particular, for individual services, according to this reference, will be handled, for example, by additional parallel cables in the tree network, or, if required, by the same cables with which parts of the tree network are connected with the central office in the form of a star or via loop lines. These approaches lead to a tree-star structure, a star-tree structure or a loop-tree structure at the active network regions or planes where amplifier locations are provided. In the passive network regions or planes near the users, which require considerable expenditures for lines, two alternatives are emphasized in that reference:

If the expenditures are transferred into the transmission systems, the tree structure can be retained. Multiplex formation in frequency- or time-multiplex form leads to a large number of individual data and still picture channels;

From a star point a cable leads to a respective user. A star point is the point of intersection with the higher-order tree network. The bandwidth for transmission on such a cable as well as in the higher-order network is to be divided for separating upstream and downstream channels.

Compared to the tree network, the star network offers greater security against listening-in and interference in the return channel as well as against unauthorized watching of pay programs. A special code, i.e. scrambling, is not required for this purpose.

SUMMARY OF THE INVENTION

It is an object of the present invention to provide a novel system which permits up to 10% of all users to interactively participate simultaneously.

Another object of the invention is to enable a plurality of television channels to be transmitted in the downward direction, i.e. from the central station, for unlimited information distribution.

A further object of the invention is to provide television and data channels capable of transmitting in both the downward and upward directions for individual information distribution so that services can be offered, in particular, which contain still and moving video pictures as information.

A further object of the invention is to make the number of channels offered economical, i.e. to make the number correspond essentially to demand with low equipment costs.

A further object of the invention is to exclude networks foreign to the system, even for the return channels.

A further object of the invention is to at least initially provide devices which go beyond the absolutely required minimum equipment of a subscriberstation for interactive communication, in the central office or in higher network planes, if possible, with a correspondingly reduced number of services at the user locations.

A further object of the invention is to subdivide the total service area with a given location for the central office into suitable service regions.

A further object of the invention is to enable the transmission system to operate without exchanges in the upper network planes and to be equipped as much as possible with identical transmission devices.

Further objects of the invention are to assure secure communications, to protect, in particular, the upstream transmission against interference originating at user locations, and to prevent unauthorized access.

A further object of the invention is to make possible telecommunications between users which can however be prevented by simple measures taken in the central office.

These and other objects are achieved, according to the present invention, by an interactive cable television system for serving a plurality of user locations in a service area divided into a plurality of service regions, including a central office and a service network having a portion composed of parallel cables arranged in a tree pattern possessing a plurality of nodes connected to the central office and remote from the user locations and, in the vicinity of the users, a further portion composed of transmission cables connected to groups of user locations, the transmission cables being connected to each group in a star pattern, the system presenting a plurality of transmission paths and means permitting multiple utilization of the paths, in which: in each service region the parallel cables of the first mentioned portion of the network are connected in a tree structure extending from one node toward the user locations and are constituted by two parallel autonomous sets of cables thus representing network planes B, C and D; the network further includes in each service region, a plurality of junction devices each connected to said parallel cables of network plane D at the outer end of a respective branch of the tree structure and, in a star pattern, to the transmission cables representing a network plane E of a respective group of user locations; and the network further includes a first connecting cable which is common to all nodes connected in a tree structure between the central office and all nodes, the first cable being connected at the nodes to one of the sets of cables, and second connecting cables connected in a star structure to the central office independently of one another and of the first connecting cable, each second connecting cable being connected at a respective node to the other set of parallel cables associated with a respective service region, thus representing a network plane A.

This network can be understood as a superposition of two autonomous networks, one of them being arranged in tree-star structure extending from the central office all over the total service area, the other being arranged in star-tree-star structure extending with its starting star structure portion from the central office to the service regions and within each respective service region with following tree-star structure portion. The star structure portions in the vicinity of the users are composed of single cables common to both superposed networks.

This network structure provides a very high number of channels in an economical manner. The parallel service regions can be supplied, through the cable which is common to all service regions, with, for example, 12 television channels for network programs. In addition, this autonomous network offers the possibility of transmitting in broadband channels in the upward direction, i.e. toward the central office, as well as in narrowband channels in both the upward and downward directions. This autonomous part of the network is thus suited for the performance of services involving a data dialog and the retransmission of television signals to the central office as well as, particularly, for unlimited distribution of information and, within limits, for the limited distribution of information.

Since each service region is connected with the central office via a respective second cable of the other autonomous network, which cable serves its associated region exclusively, the individual television signals intended for the respective service region can be distributed over this second cable. Thus, the system involves a two-cable network and a transmission system which is capable of offering data dialogs and unlimited distribution without differentiation of the individual service regions and individual distribution for every service region according to the individual requirements.

The transmissions in the television and data channels in the upward and downward directions in the network common to all service regions permit the use of identical frequency crossover filters. The cables employed and the amplifiers of the two networks for unlimited information distribution as well as for individual information distribution can also be of identical design. If amplifiers with the same gain are used for downstream and upstream transmission, for upstream channel transmission two of three amplifiers locations can be saved compared to the downstream channel transmission since less cable attenuation prevails in the frequency range of the return channel transmissions.

The advantageous characteristics of a cable television system having such a network structure and the corresponding transmission system as well as the preferred embodiment of the invention to which the dependent claims relate, are evident in detail from the explanations that follow.

Of particular significance for the invention are the junction devices which are provided at the end points of the tree-shaped networks in the service regions. From there, single cables lead to the user terminals in a star configuration. The junction devices must therefore be equipped with controllable coupling devices between the autonomous parallel cables of the higher order network and the single cables of the star network near the users for the selection of the channels intended for a particular user or for the assignment of channels for the data flow emanating from the users and fed into the network.

In contradistinction to a pure distribution network in which all of the transmitted information is offered to every user, in an interactive system the individual information is to take provided to each respective user or is to be supplied by each respective user in such a manner that unauthorized access is prevented. Additionally, the channels for unlimited information services of the pure distributing part of an interactive system must be appropriately brought to the user terminals. These tasks, as well as the prevention of possible interference originating at the user region from reaching the upstream network, are performed by the junction device.

The engineering design of the system and of the equipment for interactive cable television is determined, on the one hand, by the fact that a large number of radio and particularly television programs must be distributed. On the other hand, interactive telecommunication services are to be offered in a much larger number, certain differences resulting when telecommunication is permitted or not permitted between users. The practical system is influenced essentially by the service quality of the respective services and to a great extent by the amount of traffic involved in the totality of services. By subdividing the total service area into service regions, and due to the particular structure of the supply network, there results an extremely economical availability of channels. In addition to the unlimited distribution programs, users in the individual service regions can be supplied via the second autonomous network, with selected programs that are being carried only in the respective service region where certain users are located. For example, for each service region, capacity can be provided, in the downward direction, for 30 television channels for individual television programs, 12 television channels for distributed programs, as well as data channels and voice channels, and, in the upward direction, for 4 television channels as well as data channels and voice channels.

In a total service area which is subdivided into ten service regions, it is possible in this way to realize a capability of 300 television channels in the downward direction for individual information distribution. The frequency allocations of such a transmission system will be explained below. It should be pointed out, however, that the subdivision of the total service area into service regions should be made according to the expected user traffic. The number of service regions can then be made equal to the ratio of the maximum number of simultaneously transmitting individual channels in the total network, plus a percentage for increasing the availability, to the channel capacity of one cable.

If nodes provided for individual service regions are located in different geographical directions from the central office, but at approximately equal distances, it is also possible to use the same rights-of-way for both the autonomous cables between the central office and the nodes. This actually star-like structure with respect to the cable common to all nodes has nothing in common, however, with the tree structure of this autonomous network. Decisive for the differentiation in the star or tree network is only the supply of the respective cable.

For increasing the return channel capacity, it is advantageous to provide a cable which is parallel to the autonomous cable common to all nodes and which extends between the central office and the nodes as well as associated multiplexing devices in the nodes. In this way it is possible regarding return channels to assign a uniform frequency band to all junction devices in the total service area and to equip the multiplexing devices in the nodes with converters which shift these return channels in the particular frequency band assigned to the respective node. The upstream picture and data channels or voice channels, respectively, can thus be transmitted in the same frequency band within the tree networks of the service regions, which are completely independent of one another up to the nodes when seen in the upward direction. Only at the nodes which are connected together will it be necessary, in order to avoid signal intermingling, to separate these channels originating from different service regions and to convert the frequency bands into separate ranges. In this connection it is of particular advantage, for example with respect to susceptibility to interference, to assign the lowermost frequency band to the node most remote from the central office and vice versa. The higher frequency bands are thus used for transmission over the shorter paths.

As already mentioned, 30 individual television programs are to be carried, for example, into each individual service region in the downward direction. As a result, the second transmission paths belonging to the service regions and extending between the central office, via the nodes, into the associated autonomous tree networks of the service regions should preferably by equipped for adjacent channel occupation. This includes such devices as receiver converters usable for multichannel and adjacent channel occupation. The much higher channel capacity, compared to the network for purely distributed programs, in which, for example, only 12 channels are being transmitted requires, for the same transmission quality, for example, the use of low-attenuation cables and amplifiers of greater linearity so as to avoid a reduction of the system operating level with respect to the cable network and the corresponding reduction of the range of the network operated with adjacent channel occupation.

The connecting cables belonging to the individual service regions and extending between the central office and the nodes may also be provided in duplicate and grouped in pairs alternatingly for adjacent channels, and the nodes may be equipped with devices for interlacing the adjacent channels. Reduction of the transmission capacity to half in each individual cable permits raising of the operating level compared to that possible in the case of adjacent channel occupation in a single cable.

DESCRIPTION OF THE PREFERRED EMBODIMENTS

Figure 1:
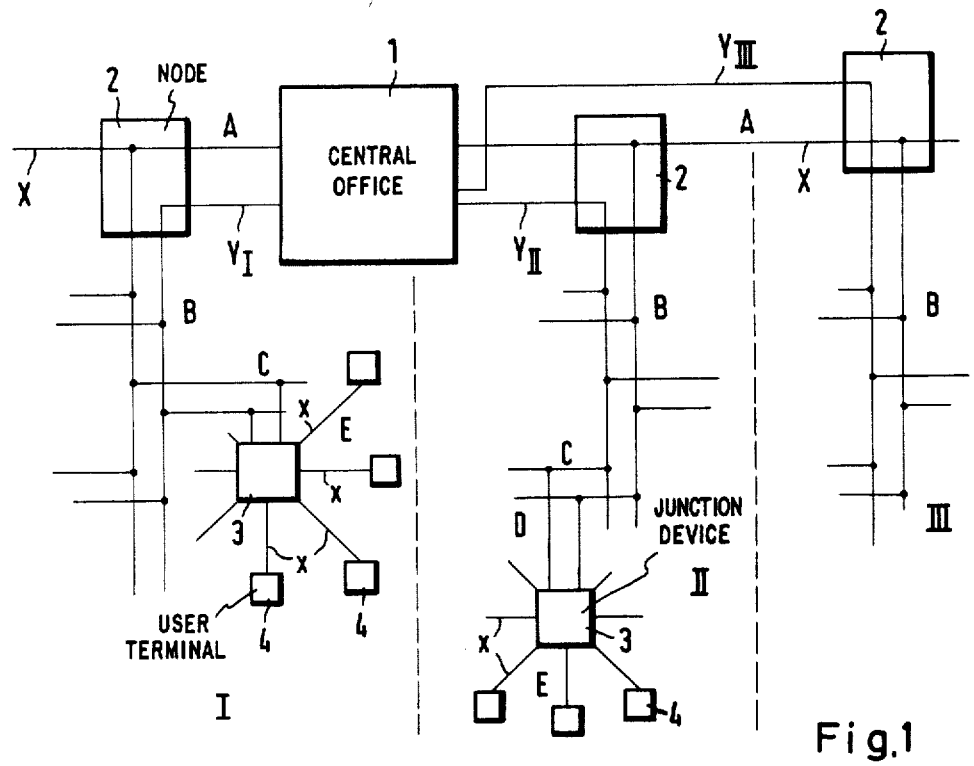
FIG. 1 is a block circuit diagram of a system for interactive cable television according to the invention, including a central office, or station, distribution network, node members, junction or ramp devices and user terminals.

In the interactive cable television system shown in FIG. 1, there are provided a cable X and Cables $Y_I$, $Y_{II}$, $Y_{III}$, etc. which lead from a central office 1 to each of a plurality of nodes 2. Each node 2 is associated with a respective service region I, II, III, etc. Cable X is arranged in the form of a tree structure having a node at each node 2. Therefore, even if cable X is brought locally from the central office 1 to nodes 2 in a star-like pattern, the service regions I, II, III . . . are fed in parallel with the same unlimited distribution information thereby.

A respective cable $Y_I$, $Y_{II}$, $Y_{III}$, etc. of a star structure is provided for the node 2 of each associated service region I, II, III, etc. Between the central office 1 and each node 2 there is a network plane, or area, A. Then in a succession of network planes, or areas, B, C and D between each node 2 and its associated service region there is provided a tree network composed of parallel autonomous cables. These tree networks lead to ramp, or junction, devices 3. A single cable x leads to each user terminal 4 from an associated ramp device 3. The region between each terminal 4 and an associated device 3 defines a network plane E.

Figure 2:
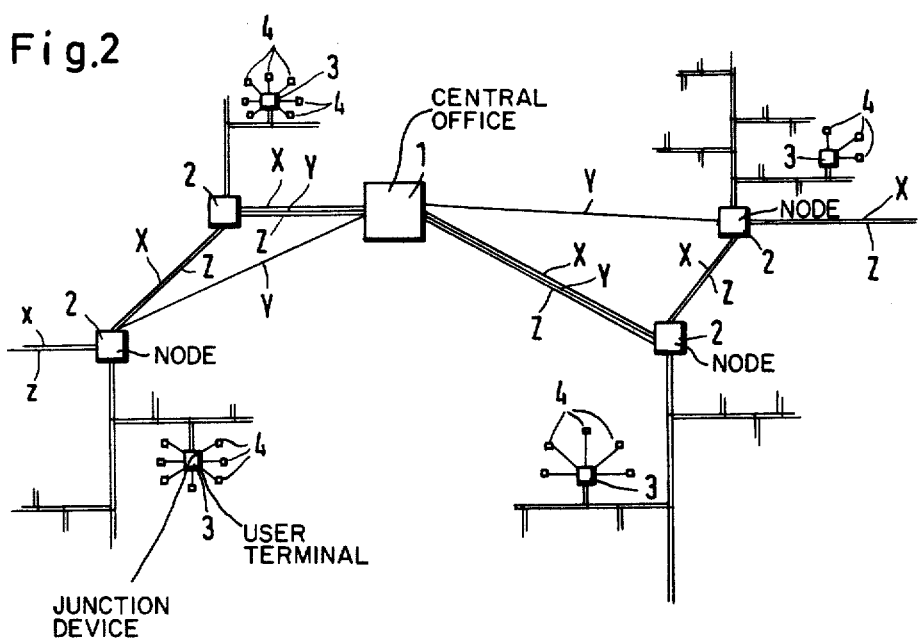
FIG. 2 is a diagram of a system similar to FIG. 1 but including an additional cable for return channels.

In the system shown in FIG. 2 the same parts bear the same reference numerals. This system differs from the system shown in FIG. 1 in that an additional cable Z is provided between the nodes 2 and the central office 1, i.e. in parallel with cable X of network plane A. In this case the nodes 2 are equipped with multiplexing devices to collect the signals coming from network planes D, C, B and being shifted in network plane A on cable Z for transmitting upstream channels from each node 2 of each service region to the central office 1.

Figure 3:
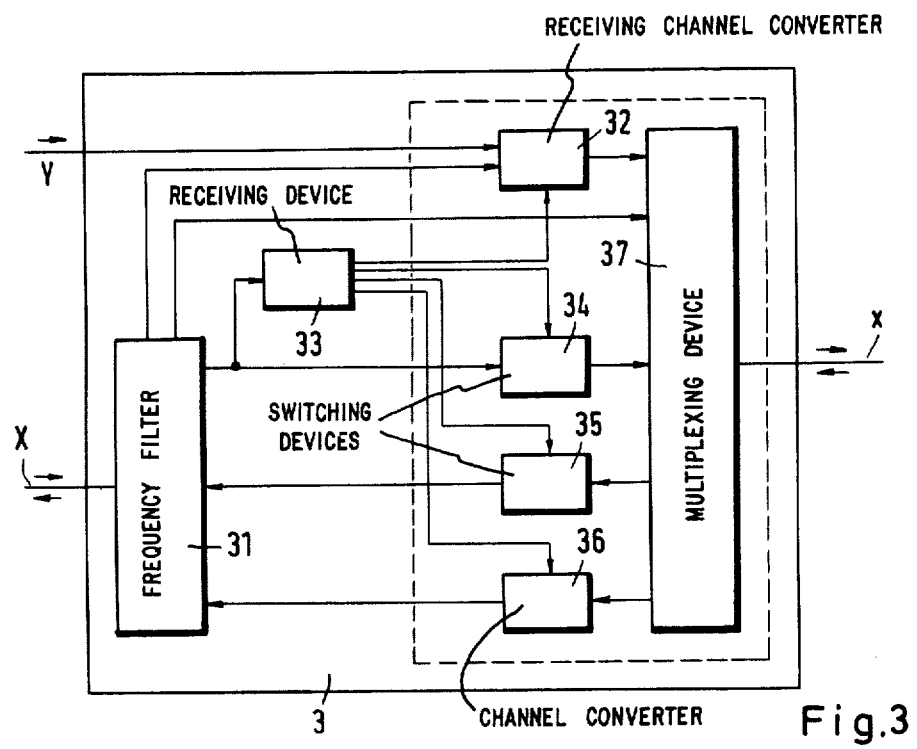
FIG. 3 is a block circuit diagram of a junction device employed in systems according to the invention.

FIG. 3 shows one embodiment of a junction device 3 in a system according to the invention, in which a cable X and a cable Y coming via higher order network planes and a line x leading to a user terminal 4 are associated. The components enclosed by a broken-line box in FIG. 3 are associated with one respective terminal 4. Broadband television channels and narrowband data and voice channels are conducted via cable X both downstream toward terminals 4 and upstream toward station 1. A frequency filter or frequency multiplexing device 31 is provided for this purpose. Directly connected to one output thereof is a receiving device 33 for the digital transmission system from which subsequent components, which are provided separately for each user terminal, are controlled.

In the downward, or distributing, direction the individual channels in cable Y go directly to a controllable receiving channel converter 32 which is controlled by device 33. Moreover, this receiving channel converter 32 also receives, via filter 31, further channels which are transmitted via cable X and do not contain pure distribution programs, i.e. pay programs. The channels transmitted on cable X and containing only distribution programs reach the user terminal without obstruction by frequency filter 31. The digital information intended for the individual user is decoupled for that user in a switching device 34. A switching device 35 directs the digital information produced by the user into the network. Signals in the broadband channels assigned to a user reach the higher network planes via a controllable transmitting channel converter 36 and the frequency filter 31.

All data flow intended for one user or transmitted by one user, respectively, is combined or separated, respectively, in a signal multiplexing device 37. Transmission is effected through the cable x leading to that user terminal.

Figure 4:
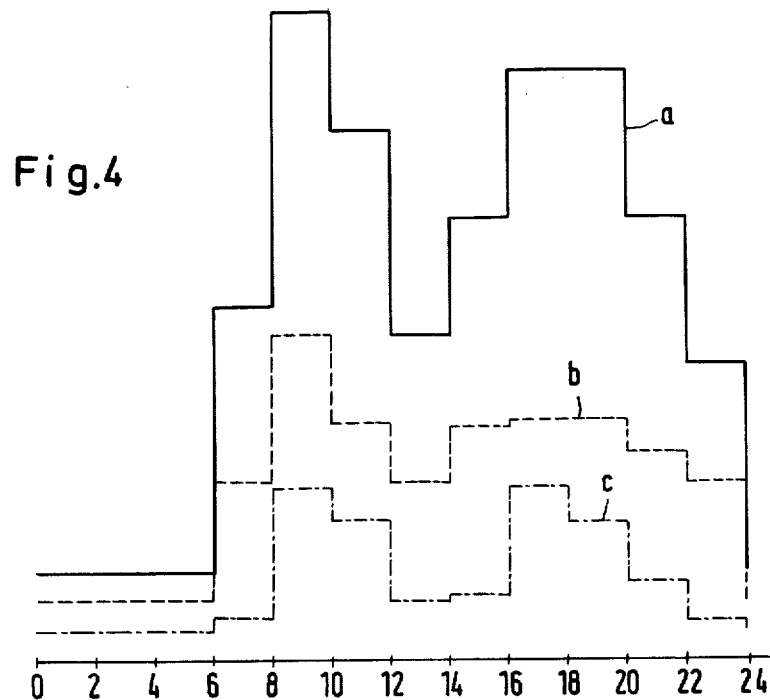
FIG. 4 is a diagram illustrating the requirement of data channels, television channels and voice channels in dependence on the time of day.

In FIG. 4 the requirements of users in a total service area for data channels a, television channels b and voice channels c has been plotted with respect to time for the period of one day, divided into 24 one-hour segments. The possible types of telecommunication and their estimated usage, e.g. market information, consumer counseling, teaching and buying, lead regarding to data traffic to the relationships indicated for these users which are simultaneously connected with the system in interactive service, representing a number which is identical with the number of required data channels. With respect to, for example, 10.000 users or subscribers, the requirement that results is 200 to 300 television channels b, about 1000 data channels a and about 50 voice channels c, as shown in the curves. For the number of video channels it was assumed that no fixed, i.e. stationary, or still, grey scale picture recording capability is provided at the subscriber's terminal, that is that, during a dialog, still picture information must be continuously transmitted via a television channel which is thus occupied for a correspondingly long time.

About 90% of the video sources in dialog traffic are still picture sources; the requirement for video channels therefore drops considerably if the users are supplied with video still store equipment and therefore only one frame need be transmitted. In the upward direction, toward station 1, about 10% of the television distribution capacity must be provided. For user numbers other than 10,000, these relationships apply proportionately.

The system shown schematically in FIGS. 1 and 2 can be divided for use by about 10,000 users in ten corresponding service regions. With a channel capacity of 30 television channels in cable Y, and 12 television channels and data and voice channels in the upward and downward directions on the cable X, and taking into account only the broadband television channels this then amounts to provision, in each service region, of one-tenth of the total requirement for the entire service area.

Figure 5:
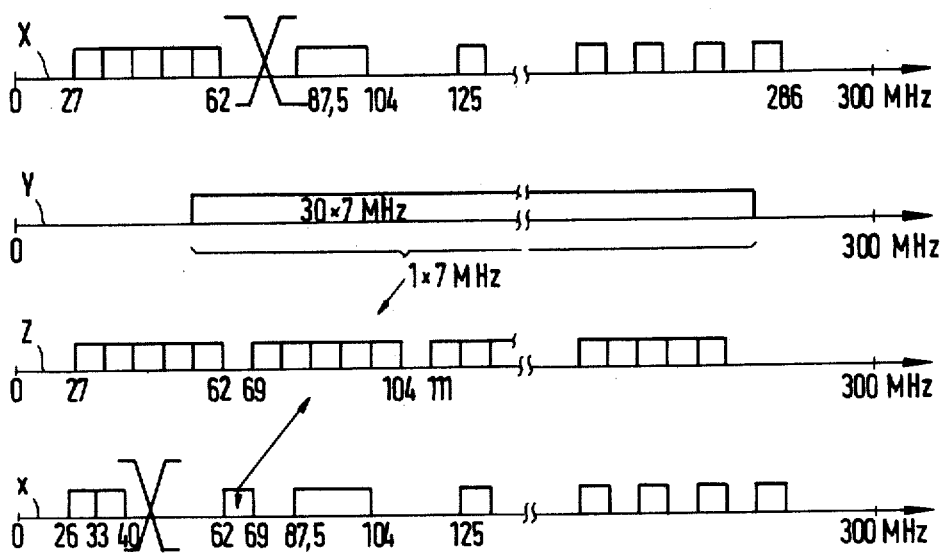
FIG. 5 is a signal diagram illustrating the organization of one form of frequency multiplex distribution in a system according to the invention.

FIG. 5 shows the organization of the network according to a frequency multiplex technique. Each cable X, Y, Z and x is designed for transmission up to 300 MHz. In cable X the lower frequency range is used for the transmission of television and data or voice channels, respectively, in the upward direction, i.e. toward office 1. While cable Z, if provided at all, extends only through network plane A, cables X and Y extend through network planes A, B, C and D.

On cable Y, 30 television channels, their spacing being 7 MHz, are transmitted in adjacent channel allocation. A user who has selected an individual television program receives his channel as one of these 30 channels. In the junction device 3 connected to that user, this channel is selected and put onto the appropriate cable x in a channel, for example allocated at 62 to 69 MHz as shown by the arrows in FIG. 5. For this purpose, use can be made in network plane E of a frequency range for a television channel which in planes B, C, D is occupied by return channels.

The upstream video, data and voice channels are transmitted in two channels allocated at 26 to 40 MHz are conducted through line x in network plane E and through cable X in two of five broadband channels in the frequency range from 27 to 62 MHz in the higher-order network planes A-D.

If a cable Z is provided in plane A, it carries the five upstream channels instead of cable X in that plane. At the boundary between network planes A and B, the return signals are converted, at nodes 2, from the 27 to 62 MHz range into higher frequency bands, e.g. from 69 to 104 MHz, 111 to 146 MHz, 153 to 188 MHz etc. and fed on cable Z to the central office 1. This makes available a high return channel capacity. Moreover, considerable advantages result for the network plane A when lines are operated always only in one direction. If, however, five broadband return channels are sufficient, they can remain in network plane A in the frequency band from 27 to 62 MHz and can be transmitted on cable X to the central office 1. In this connection, an intermediate solution involves disposition of a plurality of cables X to the central office 1 in a star-like configuration. While in the downward direction these cables X function in a tree structure, in the upward direction there are, corresponding to the layout in fact as a star pattern some more cables X in network plane A connected to the central office 1. As a result to that number of cables X the capacity of upstream channels available each comprising five broadband channels allocated from 27 to 62 MHz, is multiplied accordingly.

Independent of the above-described variations, in the network plane E for the upward direction, cables x are occupied with television signals in the IF range and with digital signals in the range from 26 to 33 MHz. In the associated junction devices 3, these upward channels are converted to the range between 27 and 62 MHz and delivered to cables X, and then, possibly, at nodes 2, to cables Z. In the downward, or distribution, direction each cable x carries the unrestrictedly distributed channels of cable X and—if required—one individual program selected from the 30 channels of cable Y as well as the digital information intended for the particular user. The frequency range of long wave, medium wave and shortwave radio broadcasts is not in any case occupied in cable x so that these signals can be fed in at the junction device 3. Such services may be received locally by an corresponding antenna system known in the art and fed into cable x within the respective junction device 3.

Cables x may be designed, for example, as coaxial cables or as light conducting, i.e. optical fiber, cables. Depending on the structure of the user locations, several, or a few users or only one individual user are connected to each junction device 3.

The data and voice signals are transmitted between the central office 1 and the users via a digital time multiplex transmission system having a high bit rate in channels each having a 7 MHz bandwidth in the upward direction in network planes D through A. If cable Z is provided this transmission from B to A occurs in cables X and Z respectively, while in the downward direction, transmission occurs normally only via cable X. If this transmission capacity in the downward direction is not sufficient for the entire service area, each individual service region can have made available its own digital transmission system via its cable Y in one of the 30 channels provided there.

The structure of the network and of the entire transmission system permits the establishment of a connection between two or more users. For this purpose only the corresponding upward and downward channels need be determined and centrally exchanged in the central office. Without such exchange in the central office, connections cannot be established between users in the above-described transmission system.

All units and devices mentioned and explained in detail in the above description are essential for constructing and operating the system according to the invention. Embodiments for the central office distributing, collecting, receiving, transmitting and, if desired, exchanging information regarding distribution and individual services, a user's or subscriber's terminal comprising at least a television set and keyboard as well as transmitter, receiver and control electronics, and devices for the technical approaches to bidirectional operation of the network, i.e. multiplexing devices operating by frequency-division multiplexing, time-division multiplexing, or space-division multiplexing, frequency filters, controllable channel converters, switching devices associated to a junction device and/or a node are known in the art. In this connection reference is made to publications, e.g. to "Electronics", Feb. 20, 1975, at pages 96–100; "CATV' 76", 25th Annual NCTA Convention, Dallas, Apr. 4–7, 1976, Technical Paper at pages 84–88; "TICCIT Interactive Television", The Mitre Corporation (1974). Those skilled in the art would understand that such devices and units are usable for the intended purpose.

It will be understood that the above description of the present invention is susceptible to various modifications, changes and adaptions, and the same are intended to be comprehended within the meaning and range of equivalents of the appended claims.

What is claimed is:

1. In an interactive cable television system for serving a plurality of user locations in a service area divided into a plurality of service regions, including a central office and a service network having a portion composed of parallel cables arranged in a tree pattern possessing a plurality of nodes connected to said central office and remote from the user locations and, in the vicinity of the users, a further portion composed of transmission cables connected to groups of user locations, which transmission cables being connected to each group in a star pattern, the system presenting a plurality of transmission paths and means permitting multiple utilization of the paths, the improvement wherein: in each said service region said service parallel cables of said first mentioned portion of said network are connected in a tree structure extending from one of said node toward said user locations and are constituted by two parallel autonomous sets of cables thus representing network planes B, C and D; said service network further comprises, in each said service region, a plurality of junction devices each connected to said parallel cables of network plane D at the outer end of a respective branch of said tree structure and to said transmission cables which represent a network plane E of a respective group of user locations; and said service network further comprises a first connecting cable which is common to all of said nodes and connected in a tree structure between said central office and all of said nodes, said first cable being connected at said nodes to one of said sets of cables, and second connecting cables connected in a star structure to said central office independently of one another and of said first connecting cable, each said second connecting cable being connected at a respective node to the other set of said parallel cables associated with a respective service region, thus representing a network plane A.

2. An arrangement as defined in claim 1 wherein each said junction device arranged at the border between the network planes D and E comprises controllable switching devices connected between said autonomous parallel cables extending from a respective node and said transmission cables connected to a respective group of user locations, of the star network near the user, said switching devices being operable for putting through distribution channels, for selecting and putting through an individual channel intended for one user location, and for assigning individual channels for the transmission of broadband and narrowband data from a respective user location into said network.

3. An arrangement as defined in claim 1 or 2 wherein said network further comprises a third connecting cable connected in network plane A between said central office and said nodes in parallel with said first connecting cable, and converting and multiplexing devices at said nodes connected between said third cables of network plane A, on the one hand, and said one of said sets of cables of network plane B, C, D, on the other hand.

4. An arrangement as defined in claim 3 wherein a uniform frequency band is associated with all of said junction devices of the entire service area for the narrowband data and broadband information flow fed into said network by user locations and said multiplex devices at said nodes comprise converters which convert the incoming data flow into a respective frequency band assigned to a particular node.

5. An arrangement as defined in claim 4 wherein a lower of the assigned frequency bands is assigned to a node farther remote from said central office and vice versa.

6. An arrangement as defined in claim 1 or 2 wherein said network further comprises devices permitting adjacent channel allocation in network planes A, B, C and D connected to said second connecting cables and to said other set of cables in network planes B, C and D.

* * * * *